United States Patent
Fujii et al.

(10) Patent No.: US 8,325,466 B2
(45) Date of Patent: Dec. 4, 2012

(54) SOLID ELECTROLYTIC CAPACITOR WITH BENT TERMINAL AND METHOD OF MANUFACTURING SAME

(75) Inventors: Eizo Fujii, Hirakata (JP); Kazuhiro Kato, Gifu (JP); Hiroya Nishimoto, Higashiosaka (JP); Shoji Umeda, Daito (JP); Koji Tezuka, Nikko (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 360 days.

(21) Appl. No.: 12/581,325

(22) Filed: Oct. 19, 2009

(65) Prior Publication Data

US 2010/0103591 A1    Apr. 29, 2010

(30) Foreign Application Priority Data

Oct. 28, 2008   (JP) .................. 2008-277039

(51) Int. Cl.
  *H01G 4/228*   (2006.01)
  *H01G 9/00*    (2006.01)
  *H01G 9/04*    (2006.01)
  *H01G 9/145*   (2006.01)
(52) U.S. Cl. .......... 361/540; 361/528; 29/25.03
(58) Field of Classification Search ........... 361/523, 361/531, 540, 528; 29/25.03
See application file for complete search history.

(56) References Cited

U.S. PATENT DOCUMENTS

| | | | |
|---|---|---|---|
| 6,236,561 B1 * | 5/2001 | Ogino et al. | 361/523 |
| 6,467,142 B1 | 10/2002 | Shirashige et al. | |
| 6,519,135 B2 * | 2/2003 | Sano et al. | 361/510 |
| 6,912,117 B2 * | 6/2005 | Arai et al. | 361/523 |
| 7,916,457 B2 * | 3/2011 | Horio et al. | 361/541 |
| 2009/0237867 A1 * | 9/2009 | Kurokawa | 361/540 |

FOREIGN PATENT DOCUMENTS

| | | | |
|---|---|---|---|
| JP | 11135367 A | * | 5/1999 |
| JP | 2001-006977 A | | 1/2001 |
| JP | 2002299165 A | * | 10/2002 |
| JP | 2005079357 A | * | 3/2005 |
| JP | 2005-093820 A | | 4/2005 |
| JP | 2005228801 A | * | 8/2005 |
| WO | WO 2006120779 A1 | * | 11/2006 |

* cited by examiner

*Primary Examiner* — David M Sinclair
(74) *Attorney, Agent, or Firm* — Westerman, Hattori, Daniels & Adrian, LLP

(57) ABSTRACT

A solid electrolytic capacitor includes a capacitor element from which an anode lead projects forward and having a surface on which a cathode layer is formed, an exterior resin covering the capacitor element, and anode and cathode terminals including, respectively, an anode and cathode terminal surfaces which are exposed from a bottom surface of the exterior resin. The anode terminal is formed from one metal plate, and includes a terminal part forming the anode terminal surface, a folded part folded back at a side edge of the terminal part and arranged over a top surface of the terminal part, and an upright part bent vertically to the top surface of the terminal part at a front edge or a rear edge of a tip end part of the folded part. A tip end part of the anode lead is electrically connected to a tip end of the upright part.

7 Claims, 11 Drawing Sheets

SOLID ELECTROLYTIC CAPACITOR WITH BENT TERMINAL AND METHOD OF MANUFACTURING SAME

The application Number 2008-277039, upon which this patent application is based, is hereby incorporated by reference.

BACKGROUND OF THE INVENTION

1. Field of the Invention

The present invention relates to solid electrolytic capacitors and a method of manufacturing same.

2. Description of Related Art

As shown in FIG. 12, a conventional solid electrolytic capacitor comprises a capacitor element 101 from which an anode lead 112 projects forward and having a surface on which a cathode layer 115 is formed, an exterior resin 102 covering the capacitor element 101, and an anode terminal 103 and a cathode terminal 104 including, respectively, an anode terminal surface 103a and a cathode terminal surface 104a which are exposed from a bottom surface 102a of the exterior resin 102. To a top surface of the anode terminal 103, connected is a connecting member 105 having a predetermined height. Also, to a top end of the connecting member 105, connected is a tip end part 112a of the abode lead 112. To the cathode terminal 104, connected is the cathode layer 115 of the capacitor element 101.

Thus, by connecting the tip end part 112a of the anode lead 112 to the anode terminal 103 by means of the connecting member 105, it is possible to arrange the anode lead 112 at a predetermined position in the height direction.

In the solid electrolytic capacitor described above, however, welding, which is one of factors which reduce productivity of solid electrolytic capacitors, is necessary in both a step of connecting the connecting member 105 to the anode terminal 103 and a step of connecting the tip end part 112a of the anode lead 112 to the connecting member 105.

In view of the above problem, in order to reduce the number of welding operations, there has been proposed a method in which, by performing a bending process on one metal plate, formed is an anode terminal which includes the conventional anode terminal 103 and connecting member 105 integrally.

In particular, as shown in FIGS. 13a to 13c, there has been proposed a method in which, the anode terminal is formed by performing the bending process on a flat plate-like anode frame member 106. As shown in FIG. 13a, the anode frame member 106 comprises a terminal forming part 161 including a bottom surface 161a which is to be the anode terminal surface 103a, a projection part 162 formed at a side edge of the terminal forming part 161, and a belt part 163 extending in a belt shape from the projection part 162 along the side edge of the terminal forming part 161. As shown in FIG. 13b, the belt part 163 is bent upward vertically to the projection part 162, and as shown in FIG. 13c, the projection part 162 is bent vertically to the terminal forming part 161 so that the belt part 163 is arranged vertically to a top surface of the terminal forming part 161 to form the anode terminal.

To a top end 163a of the belt part 163 included in the anode terminal, connected is the tip end part 112a of the anode lead 112 of the capacitor element 101.

When forming the anode terminal by performing the bending process on one metal plate in such a manner, there is no need for welding between the anode terminal 103 and the connecting member 105, which is necessary in a conventional way, and therefore, the productivity of the solid electrolytic capacitor increases.

However, if an error (deviation from 90 degrees) occurs in a bending angle when bending the belt part 163 vertically to the projection part 162 (FIG. 13b), it is possible that the position of the belt part 163 deviates forward or backward from a position where the tip end part 112a of the anode lead 112 is to be connected to the belt part 163, resulting in a poor connection between the belt part 163 and the tip end part 112a of the anode lead 112. Specifically, in a solid electrolytic capacitor having a large width, there will be a considerable deviation of the belt part 163 caused by the error in the bending angle.

Also, in the case where the belt part 163 and the tip end part 112a of the anode lead 112 are connected to each other by resistance welding, the tip end part 112a of the anode lead 112 is pressed to the top end 163a of the belt part 163, and therefore, a great power is applied to the belt part 163 downward. However, since a bottom end of the belt part 163 is not directly coupled to the terminal forming part 161 located vertically to the belt part 163, the belt part 163 lacks strength to withstand the power applied in the resistance welding operation, and therefore, it is possible that the belt part 163 is bent by said power.

SUMMARY OF THE INVENTION

In view of above described problem, an object of the present invention is to increase a productivity of a solid electrolytic capacitor and prevent a poor connection between an anode lead and an anode terminal from being caused and the anode terminal from being bent.

A solid electrolytic capacitor according to a first aspect of the present invention comprises a capacitor element from which an anode lead projects forward and having a surface on which a cathode layer is formed, an exterior resin covering the capacitor element, and an anode terminal and a cathode terminal including, respectively, an anode terminal surface and a cathode terminal surface which are exposed from a bottom surface of the exterior resin. The anode lead is electrically connected to the anode terminal, while the cathode layer is electrically connected to the cathode terminal.

The anode terminal is formed from one metal plate, and comprises a terminal part forming the anode terminal surface, a folded part folded back at a side edge of the terminal part and arranged on a top surface of the terminal part, and an upright part bent vertically to the top surface of the terminal part at a front edge or a rear edge of a tip end part of the folded part. A tip end part of the anode lead is electrically connected to a tip end of the upright part.

A solid electrolytic capacitor according to a second aspect of the present invention is the solid electrolytic capacitor according to the first aspect described above, wherein the folded part extends from the side edge of the terminal part to a position below the tip end part of the anode lead along the top surface of the terminal part.

According to the solid electrolytic capacitors described above, it is possible to form the terminal part and the upright part by performing a bending process on one metal plate, and therefore, the welding is not necessary in steps of forming the terminal part and the upright part. Accordingly, the productivity of the solid electrolytic capacitor increases compared to that of conventional solid electrolytic capacitors.

In the case where the upright part and the tip end part of the anode lead are connected to each other by resistance welding, the tip end part of the anode lead is pressed to the tip end of the upright part, and therefore, a great power is applied to the upright part downward.

However, in the solid electrolytic capacitor described above, a base end of the upright part is directly coupled to the folded part located vertically to the upright part, and therefore, the upright part has a strength to withstand the power applied in the resistance welding. Therefore, the upright part is not bent by said power.

A solid electrolytic capacitor according to a third aspect of the present invention is the solid electrolytic capacitor according to the second aspect described above, wherein a height of the upright part is smaller than a length of the folded part.

According to the solid electrolytic capacitor of the third aspect described above, a length from a bending position to the tip end of the upright part is shorter than a length L1 (see FIG. 13c) of the belt part 163 in the conventional solid electrolytic capacitor of the same size. Therefore, even in the case where an error occurs in the bending angle when forming the upright part, the position of the tip end of the upright part deviates forward or backward only slightly from a predetermined position where the tip end part of the anode lead is to be connected to the upright part. Thus, the poor connection between the upright part and the tip end part of the anode lead hardly occurs. That is, the solid electrolytic capacitor is hardly affected by the error in the bending angle.

A manufacturing method of the solid electrolytic capacitor according to the present invention is a method of manufacturing a solid electrolytic capacitor comprising a capacitor element from which an anode lead projects forward and having a surface on which a cathode layer is formed, an exterior resin covering the capacitor element, and an anode terminal and a cathode terminal including, respectively, an anode terminal surface and a cathode terminal surface which are exposed from a bottom surface of the exterior resin, and the method comprises a frame body forming step and an element mounting step.

The frame body forming step is a step of forming a frame body by performing a bending process on a flat plate-like frame member including an anode section which is to be the anode terminal, and a cathode section which is to be the cathode terminal. The anode section comprises a terminal forming part including a bottom surface which is to be the anode terminal surface, a belt part extending in a belt shape from the terminal forming part, and a projection part formed at a tip end part of the belt part. The belt part extends in a vertical direction to one direction from the anode section to the cathode section, while the projection part projects from the tip end part of the belt part in said one direction or the opposite direction thereto. In the bending process described above, the projection part is bent downward vertically to the belt part, and the belt part is folded over to be arranged on a top surface of the terminal forming part to form the frame body.

In the element mounting step, the capacitor element is mounted on a top surface of the frame body, and the tip end part of the anode lead of the capacitor element comes into contact with a tip end of the projection part of the frame body, while the cathode layer comes into contact with the cathode section of the frame body.

According to the manufacturing method of the solid electrolytic capacitor described above, the terminal part and the upright part are formed by performing the bending process on the anode section of the frame member, and therefore, the welding is not necessary in the frame body forming step. Accordingly, the productivity of the solid electrolytic capacitor increases compared to that of conventional solid electrolytic capacitors.

Also, in the element mounting step, in the case where the tip end of the projection part and the tip end part of the anode lead are connected to each other by resistance welding, the tip end part of the anode lead is pressed to the tip end of the projection part, and therefore, a great power is applied to the projection part downward.

However, in the manufacturing method described above, a base end of the projection part is directly coupled to the belt part located vertically to the projection part, and therefore, the projection part has a strength to withstand the power applied in the resistance welding operation. Therefore, the projection part is not bent by said power.

As described above, according to the solid electrolytic capacitor of the present invention and the manufacturing method thereof, the productivity of the solid electrolytic capacitor increases and a poor connection between an anode lead and an anode terminal is hardly caused, and the anode terminal is hardly bent.

DETAILED DESCRIPTION OF THE PREFERRED EMBODIMENT

A preferred embodiment of the present invention is described in detail below with reference to the drawings.

Figure 1:
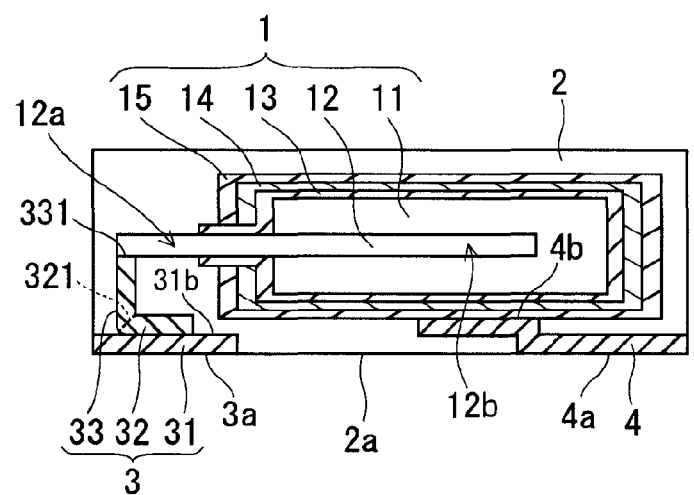
FIG. 1 is a vertical cross-sectional view of a solid electrolytic capacitor according to an embodiment of the present invention.
Figure 2:
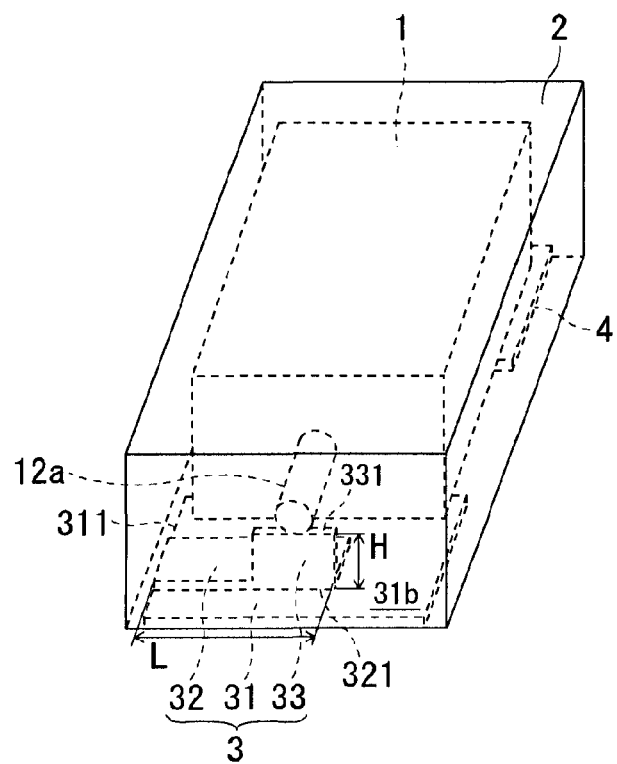
FIG. 2 is a perspective view of the solid electrolytic capacitor.

As shown in FIGS. 1 and 2, a solid electrolytic capacitor according to the embodiment of the present invention comprises a capacitor element 1, an exterior resin 2 covering the capacitor element 1, an anode terminal 3, and a cathode terminal 4.

As shown in FIG. 1, the capacitor element 1 comprises an anode body 11, an anode lead 12, a dielectric layer 13, an electrolyte layer 14, and a cathode layer 15.

The anode body 11 comprises a porous sintered body formed by a metal having a valve action. As the metal having a valve action, used is, for example, tantalum, niobium, titanium, aluminum or the like.

The anode lead 12 has a tip end part 12a projecting forward from the anode body 11 and a base end part 12b embedded in the anode body 11. The anode lead 12 is formed by a metal which of the same kind as the metal forming the anode body 11, and electrically connected to the anode body 11.

The dielectric layer 13 is formed by an oxide layer which is formed by oxidizing a surface of the anode body 11. In particular, the anode body 11 is immersed in an electrolytic solution such as a phosphoric acid aqueous solution or the like, and then the surface of the anode body 11 is electrochemically oxidized (anodic oxidation) to form the oxide layer, which forms the dielectric layer 13.

The electrolyte layer 14 is formed by a conductive inorganic material such as manganese dioxide, a TCNQ (Tetracyano-quinodimethane) complex salt, a conductive organic material such as conductive polymer or the like, and formed on a surface of the dielectric layer 13.

The cathode layer 15 is formed by a carbon layer formed on a surface of the electrolyte layer 14 and a silver paste layer formed on a surface of the carbon layer, and is electrically connected to the electrolyte layer 14.

As shown in FIG. 1, the anode terminal 3 includes an anode terminal surface 3a exposed from a bottom surface 2a of the exterior resin 2. The tip end part 12a of the anode lead 12 of the capacitor element 1 is electrically connected to the anode terminal 3.

In particular, the anode terminal 3 is formed by one metal plate, and includes a terminal part 31, a folded part 32, and an upright part 33 as shown in FIG. 2. The terminal part is arranged along the bottom surface 2a of the exterior resin 2, and a bottom surface of the terminal part 31 is exposed to the bottom surface 2a of the exterior resin 2 to form the anode terminal surface 3a.

The folded part 32 is folded back at a side edge 311 of the terminal part 31 and arranged on a top surface 31b of the terminal part 31. The folded part 32 extends in a belt shape from the side edge 311 of the terminal part 31 to a position below the tip end part 12a of the anode lead 12 along the top surface 31b of the terminal part 31.

The upright part 33 is bent at a front edge 321 of a tip end part of the folded part 32 vertically to the top surface 31b of the terminal part 31. In this embodiment, a height H of the upright part 33 is smaller than a length L of the folded part 32.

The tip end part 12a of the anode lead 12 is mounted on and electrically connected to a tip end (top end) 331 of the upright part 33. The anode terminal 3 and the tip end part 12a of the anode lead 12 are thereby electrically connected to each other.

As shown in FIG. 1, the cathode terminal 4 includes a cathode terminal surface 4a exposed from the bottom surface 2a of the exterior resin 2, and the cathode layer 15 of the capacitor element 1 is electrically connected to a top surface 4b of the cathode terminal 4.

A manufacturing method of the solid electrolytic capacitor described above is discussed below. In this manufacturing method, executed in the order are a frame body forming step, an element mounting step, a resin covering step, and a cutting step.

Figure 3A:
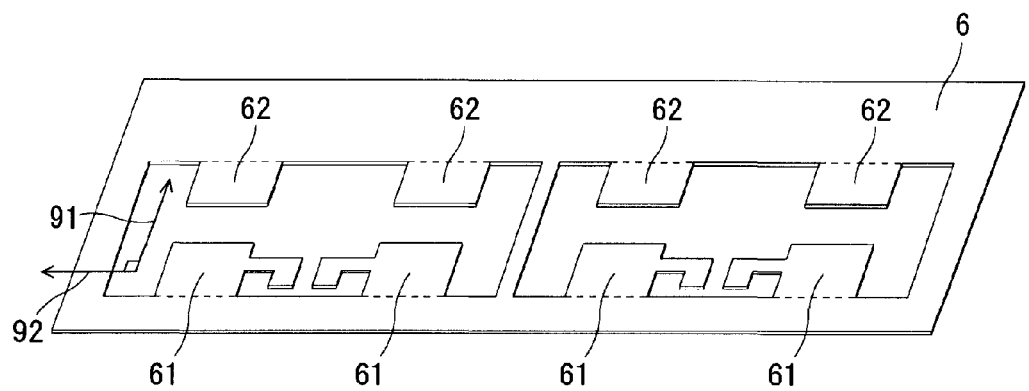
FIG. 3a is a perspective view showing a frame member used in a frame body forming step of a manufacturing method of the solid electrolytic capacitor.
Figure 3B:
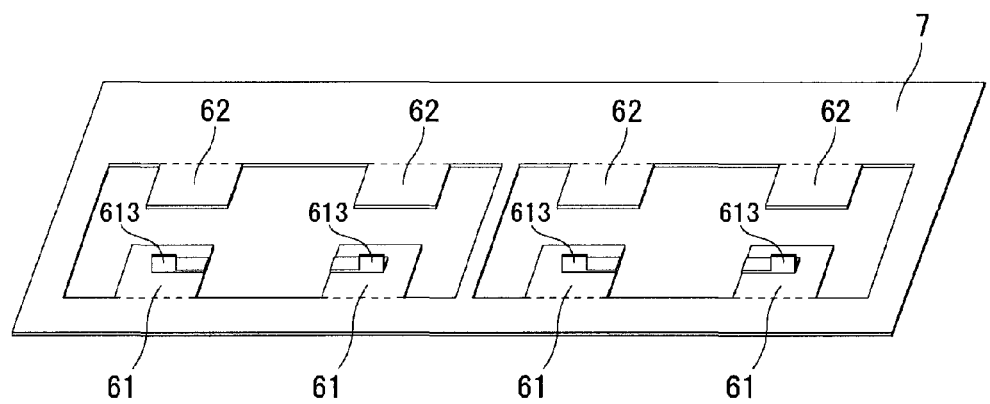
FIG. 3b is a perspective view showing a frame body formed in the frame body forming step.

First, as shown in FIGS. 3a and 3b, in the frame body forming step, a bending process is performed on a flat plate-like frame member 6 to form a frame body 7. As shown in FIG. 3a, the frame member 6 includes an anode section 61 which is to be the anode terminal 3 and a cathode section 62 which is to be the cathode terminal 4.

Figure 4A:
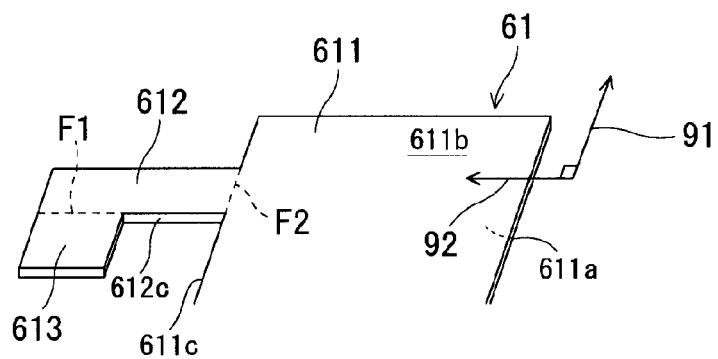
FIGS. 4a to 4c are sequential perspective views for explaining the frame body forming step.

As shown in FIG. 4a, the anode section 61 comprises a terminal forming part 611, a belt part 612, and a projection part 613. The terminal forming part 611 includes a bottom surface 611a which is to be the anode terminal surface 3a of the anode terminal 3. The belt part 612 extends in a belt shape from a side edge 611c of the terminal forming part 611 along a direction 92 vertical to one direction 91 (see FIG. 3a) from the anode section 61 toward the cathode section 62. The projection part 613 is formed at a tip end part of the belt part 612, and projects in a direction opposite to the direction 91 from an edge 612c of the belt part 612, which is on the opposite side of the belt part 612 to the direction 91.

In the bending process performed on the frame member 6 described above, as shown in FIG. 4b, the projection part 613 is bent downward vertically to the belt part 612 along a bending line F1 (see FIG. 4a) extending along the edge 612c of the belt part 612. And then, as shown in FIG. 4c, the belt part 612 is bent upward along a bending line F2 (see FIG. 4b) extending along the side edge 611c of the terminal forming part 611, so that the belt part 612 is arranged on a top surface 611b of the terminal forming part 611.

The frame body 7 is thereby formed as shown in FIG. 3b, and the belt part 612 and the projection part 613 of the frame body 7 form the folded part 32 and the upright part 33 of the anode terminal 3 of the solid electrolytic capacitor respectively.

In the bending process described above, the belt part 612 may be bent before bending the projection part 613.

Figure 5:
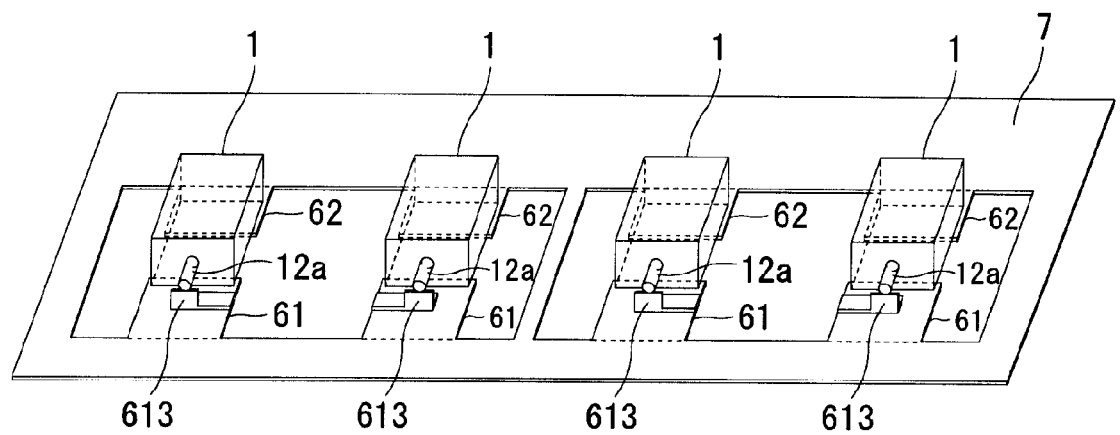
FIG. 5 is a perspective view for explaining an element mounting step of the manufacturing method.
Figure 6A:
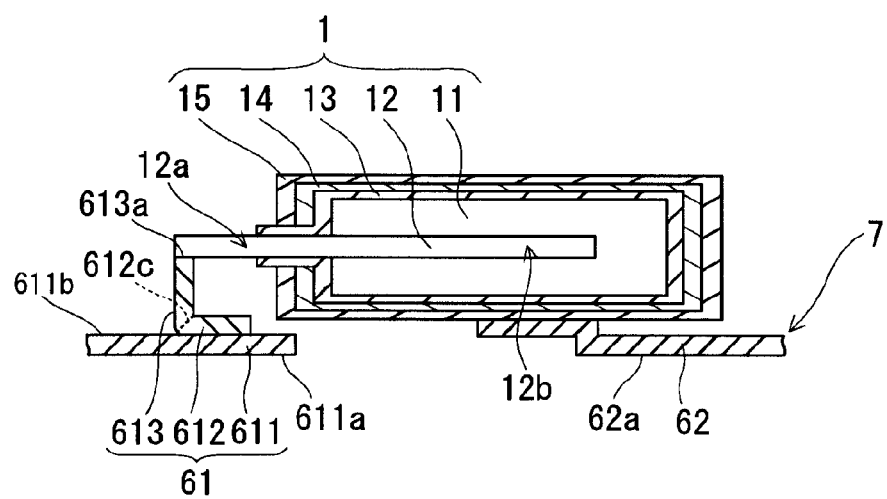
FIG. 6a is a vertical cross-sectional view of a capacitor element mounted on the frame body in the element mounting step.
Figure 6B:
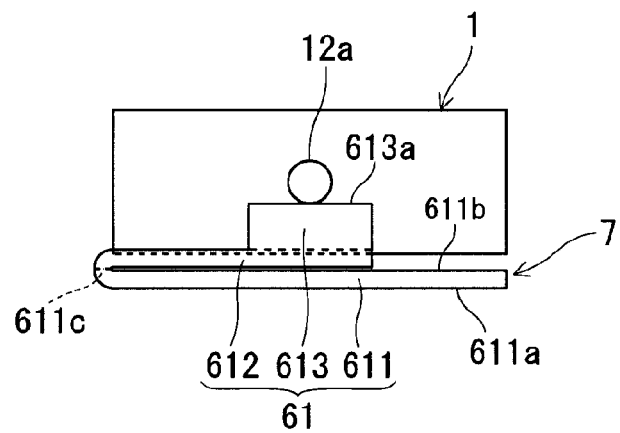
FIG. 6b is a front view of the capacitor element mounted on the frame body in the element mounting step.

After executing the frame body forming step, in the element mounting step shown in FIG. 5, a plurality of capacitor elements 1 are mounted on a top surface of the frame body 7. At this time, the tip end part 12a of the anode lead 12 of the capacitor element 1 comes into contact with a tip end 613a of the projection part 613 of the frame body 7 as shown in FIGS. 6a and 6b, while the cathode layer 15 comes into contact with the cathode section 62 of the frame body 7 as shown in FIG. 6a.

Here, the tip end part 12a of the anode lead 12 is connected to the tip end 613a of the projection part 613 by laser welding, resistance welding or the like, while the cathode layer 15 is connected to the cathode section 62 of the frame body 7 by means of an electrically-conductive adhesive or the like. Thereby the tip end part 12a of the anode lead 12 is electrically connected to the anode section 61 of the frame body 7, while the cathode layer 15 is electrically connected to the cathode section 62 of the frame body 7.

Figure 7A:
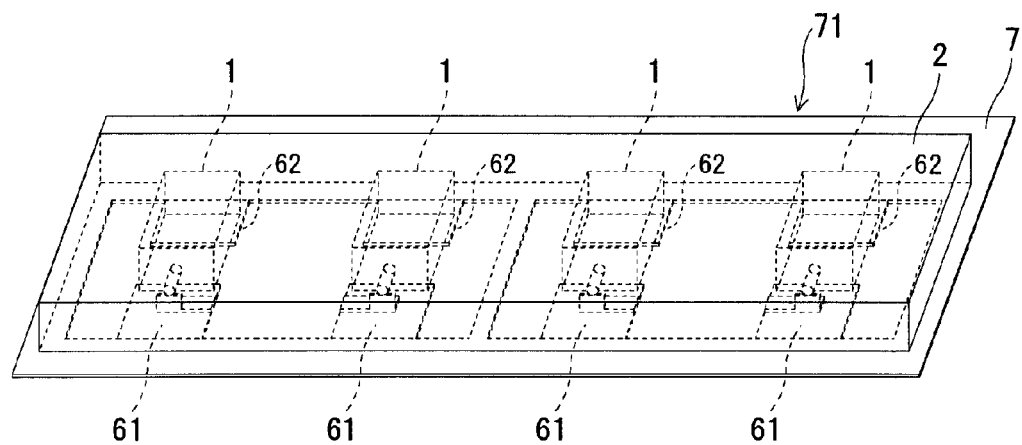
FIG. 7a is a perspective view of an element block prepared in a resin covering step of the manufacturing method taken from a top surface side of the frame body.
Figure 7B:
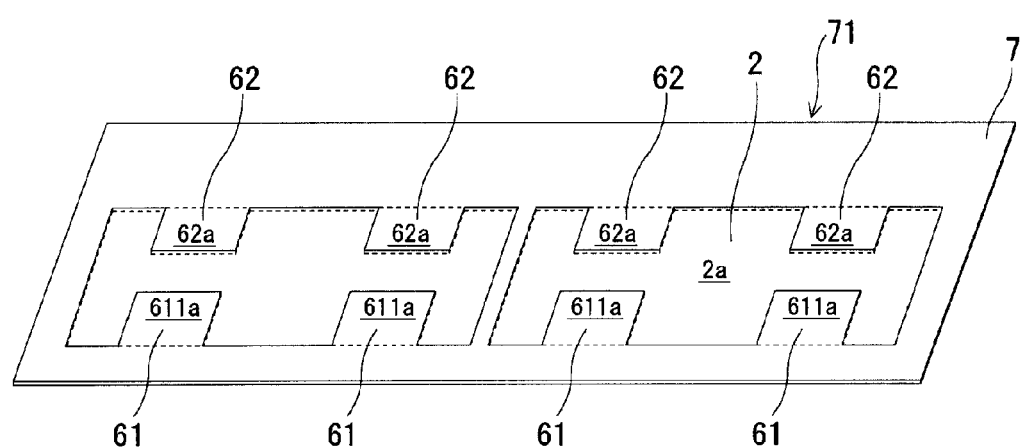
FIG. 7b is a perspective view of the element block prepared in the resin covering step of the manufacturing method taken from a bottom surface side of the frame body.

After executing the element mounting step, as shown in FIG. 7a, in the resin covering step, the frame body 7 and the capacitor element 1 are covered with the exterior resin 2 to form an element block 71. Here, as shown in FIG. 7b, a bottom surface of the frame body 7 is exposed from the bottom surface 2a of the exterior resin 2. In particular, the bottom surface 611a of the terminal forming part 611 of the anode section 61 and a bottom surface 62a of the cathode section 62 are exposed from the bottom surface 2a of the exterior resin 2. For the exterior resin 2, used is a resin material such as epoxy resin or the like.

Figure 8:
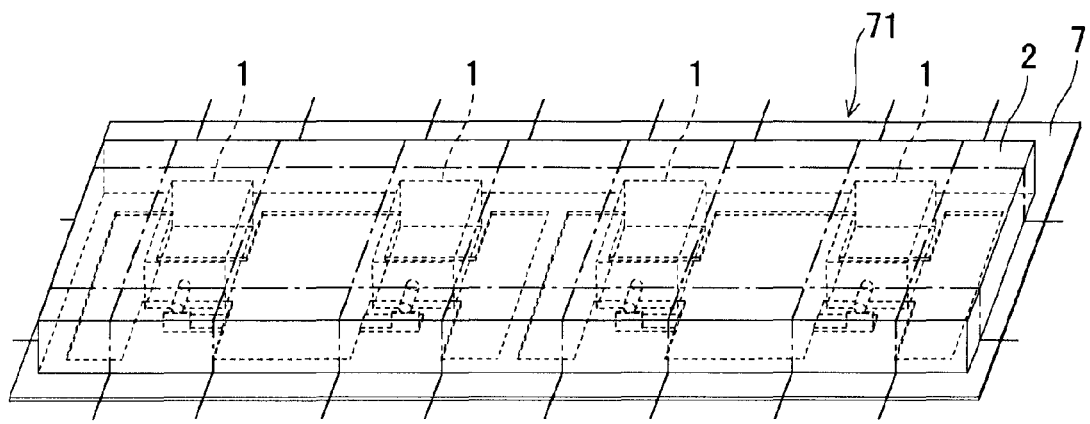
FIG. 8 is a perspective view for explaining a cutting step of the manufacturing method.

After executing the resin covering step, as shown in FIG. 8, in the cutting step, a cutting process is performed on the element block 71. In particular, the element block 71 is cut along dashed-dotted lines shown in FIG. 8. Thus, the anode terminal 3 is formed from the anode section 61 of the frame body 7, and the terminal part 31 of the anode terminal 3 is formed by the terminal forming part 611 of the anode section 61. Also, the cathode terminal 4 is formed from the cathode section 62.

Thus, prepared is the solid electrolytic capacitor shown in FIGS. 1 and 2.

According to the solid electrolytic capacitor and the manufacturing method thereof described above, since it is possible to form the terminal part 31 and the upright part 33 of the anode terminal 3 by performing the bending process on the flat plate-like frame member 6 formed by one metal plate, the welding is not necessary in the steps of forming the terminal part 31 and the upright part 33. Accordingly, the productivity of the solid electrolytic capacitor increases compared to that of conventional solid electrolytic capacitors.

Also, by adjusting the height H of the upright part 33, it is possible to arrange the tip end part 12a of the anode lead 12 at a predetermined position in the height direction.

In the case where the upright part 33 and the tip end part 12a of the anode lead 12 are connected to each other by resistance welding, in other words, in the case where the tip end part 12a of the anode lead 12 is connected to the tip end 613a of the projection part 613 by resistance welding in the element mounting step, the tip end part 12a of the anode lead 12 is pressed to the tip end 613a of the projection part 613, and therefore, a great power is applied to the projection part 613 downward.

However, in this embodiment, a base end of the projection part 613 is directly coupled to the belt part 612 located vertically to the projection part 613, and therefore, the projection part 613 has a strength to withstand the power applied in the resistance welding operation. Therefore, the projection part 613 is not bent by said power.

Figure 13A:
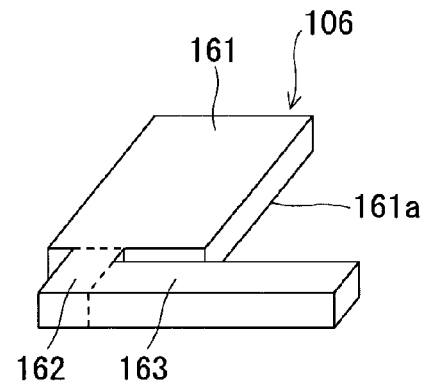
FIGS. 13a to 13c are sequential perspective views showing a manufacturing method of an anode terminal of the conventional solid electrolytic capacitor.
Figure 13B:
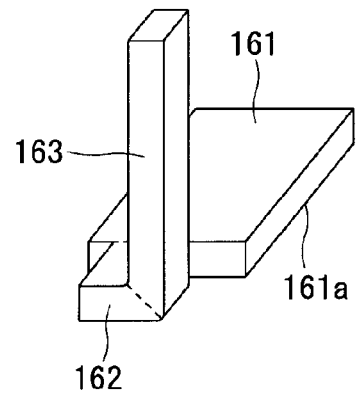
Figure 13C:
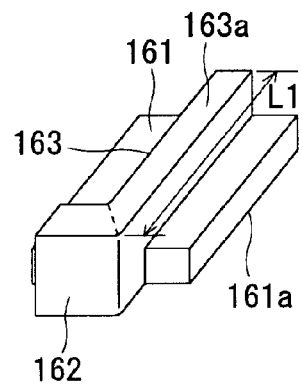

Further, in this embodiment, the height H of the upright part 33 is smaller than the length L of the folded part 32 (see FIG. 2), and therefore, a length (the height H) from a bending position (the bending line F1) to the tip end 331 of the upright part 33 is shorter than the length L1 (see FIG. 13c) of the belt part 163 in the conventional solid electrolytic capacitor of the same size.

Therefore, even if an error occurs in the bending angle when forming the upright part 33, in other words, when bending the projection part 613 along the bending line F1, the position of the tip end 613a of the projection part 613 of the prepared frame body 7 deviates forward or backward only slightly from a predetermined position where the tip end part 12a of the anode lead 12 is to be connected to the upright part 33. Accordingly, the poor connection between the upright part 33 and the tip end part 12a of the anode lead 12 hardly occurs. That is, the solid electrolytic capacitor of this embodiment is hardly affected by the error in the bending angle.

Figure 9:
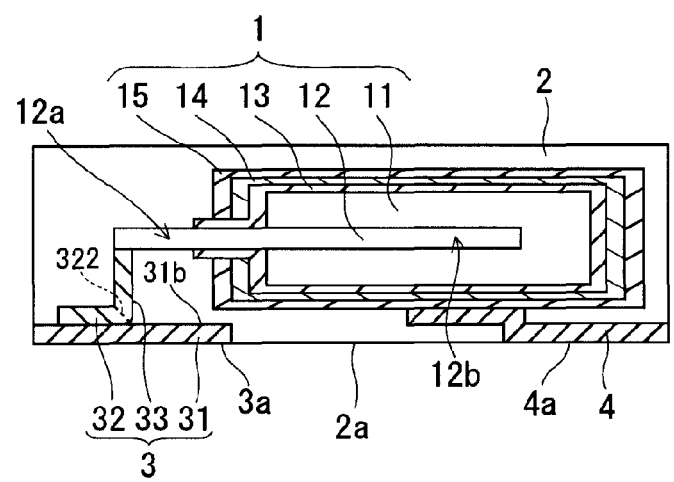
FIG. 9 is a vertical cross-sectional view of a modification of the solid electrolytic capacitor.

FIG. 9 shows a modification of the solid electrolytic capacitor described above. As shown in FIG. 9, the upright part 33 may be bent at a rear edge 322 of the tip end part of the folded part 32 vertically to the top surface 31b of the terminal part 31.

Figure 10A:
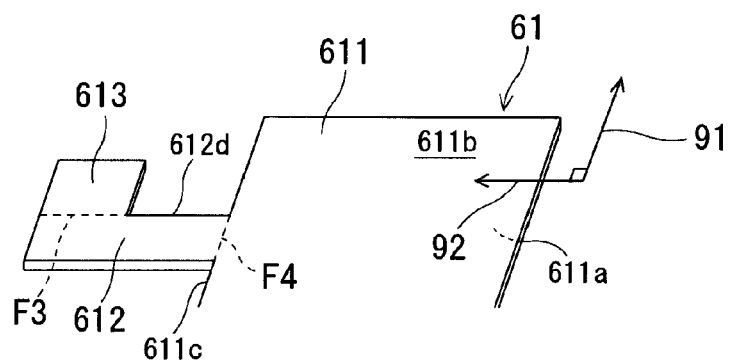
FIGS. 10a to 10c are sequential perspective views for explaining the frame body forming step of the manufacturing method of the modification of the solid electrolytic capacitor shown in FIG. 9.

In the manufacturing method of the modification of the solid electrolytic capacitor described above, in the frame body forming step, as shown in FIG. 10a, used is the flat plate-like frame member 6 which has the projection part 613 projecting in the direction 91 from an edge 612d of the belt part 612, which is on the direction 91 side.

Figure 10B:
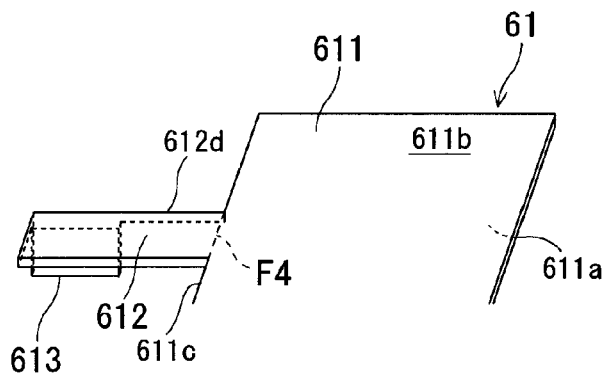
Figure 10C:
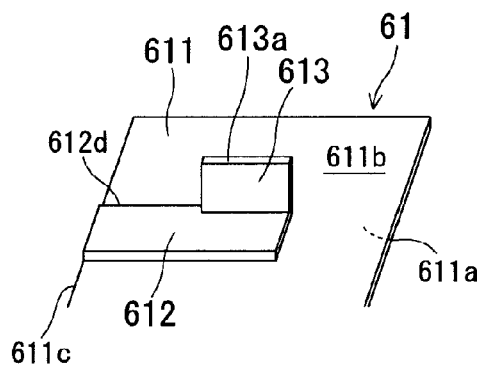

In the bending process, as shown in FIG. 10b, the projection part 613 is bent downward vertically to the belt part 612 along a bending line F3 (see FIG. 10a) extending along the edge 612d of the belt part 612. And then, as shown in FIG. 10c, the belt part 612 is bent upward along a bending line F4 (see FIG. 10b) extending along the side edge 611c of the terminal forming part 611, so that the belt part 612 is arranged on the top surface 611b of the terminal forming part 611.

The frame body 7 is thereby formed, and the belt part 612 and the projection part 613 of the frame body 7 form the folded part 32 and the upright part 33 of the anode terminal 3 of the solid electrolytic capacitor described above (FIG. 9) respectively.

The present invention is not limited to the foregoing embodiment in construction but can be modified variously within the technical range set forth in the appended claims. For example, the bending angle of the upright part 33 to the folded part 32 in the solid electrolytic capacitor, namely, the bending angle of the projection part 613 to the belt part 612 may be an angle slightly smaller than or greater than 90 degrees in the frame body forming step.

In the embodiment described above, the plurality of capacitor elements 1 are covered with the exterior resin 2 to form the element block 71, and the element block 71 is subjected to the cutting process to cut the exterior resin 2 and the frame body 7, thereby forming the solid electrolytic capacitor (see FIG. 8). However, the manufacturing method of the solid electrolytic capacitor of the present invention is not limited to this.

For example, it is also possible that a single capacitor element 1 is covered with the exterior resin 2 to form the element block 71, and the element block 71 is subjected to the cutting process to cut only the frame body 7, or to cut the exterior resin 2 and the frame body 7, thereby forming the solid electrolytic capacitor.

Figure 4B:
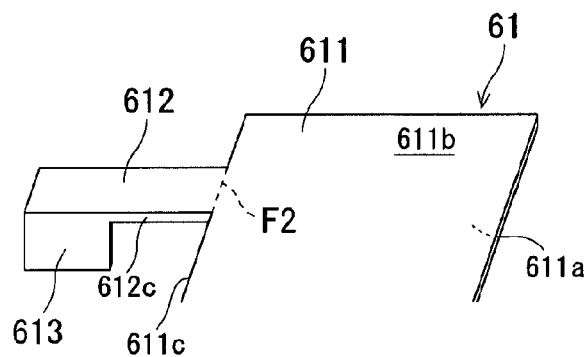
Figure 4C:
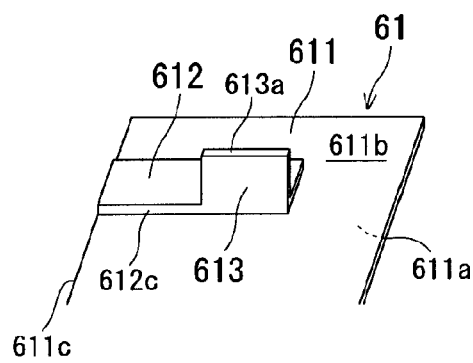

Further, in the embodiment described above, in the frame body forming step, the projection part 613 is bent along the bending line F1 extending along the edge 612c of the belt part 612 (see FIGS. 4a and 4b). However, the manufacturing method of the solid electrolytic capacitor of the present invention is not limited to this.

Figure 11A:
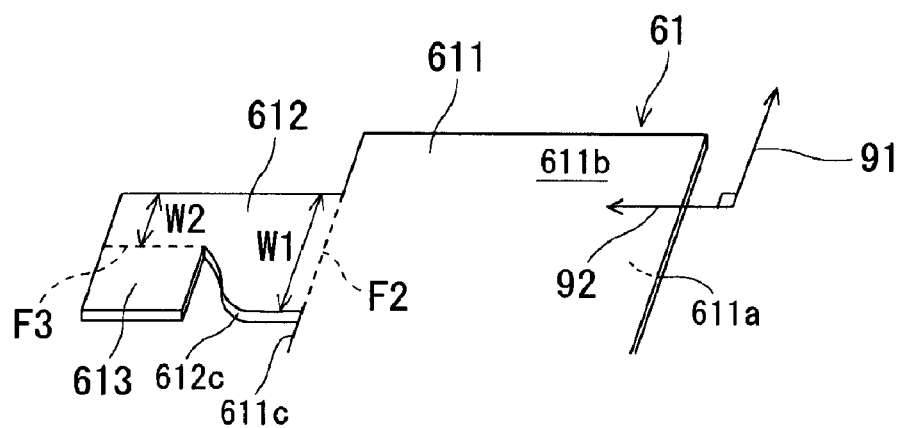
FIGS. 11a and 11b are views showing a modification of the manufacturing method of the solid electrolytic capacitor, and are sequential perspective views for explaining the frame body forming step of this manufacturing method.
Figure 11B:
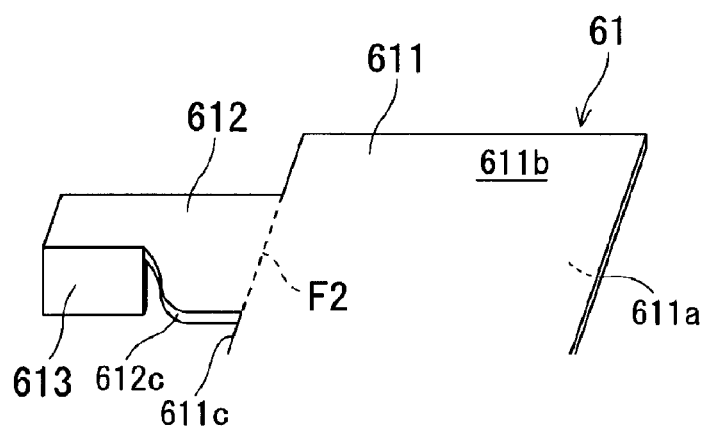
Figure 12:
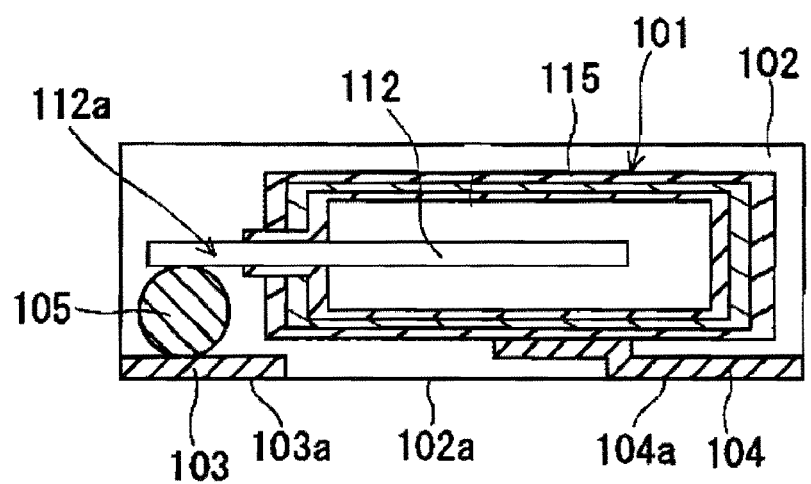
FIG. 12 is a vertical cross-sectional view of a conventional solid electrolytic capacitor.

For example, in order to enhance the strength of the belt part 612 against the bending process, as shown in FIG. 11a, when the anode section 61 has the belt part 612 having a width W2 of its tip end part and a width W1 of its base end part larger than the width W2, the projection part 613 is bent along the bending line F3 extending along the direction 92 as shown in FIG. 11b, rather than bent along the edge 612c of the belt part 612.

What is claimed is:

1. A solid electrolytic capacitor comprising: a capacitor element from which an anode lead projects forward and having a surface on which a cathode layer is formed; an exterior resin covering the capacitor element; and an anode terminal and a cathode terminal including, respectively, an anode terminal surface and a cathode terminal surface which are exposed from a bottom surface of the exterior resin, the anode lead being electrically connected to the anode terminal, while the cathode layer being electrically connected to the cathode terminal, wherein the anode terminal is formed from one metal plate, and comprises:
a terminal part having a bottom surface which is the anode terminal surface;
a folded part folded back at a side edge of the terminal part and arranged on a top surface of the terminal part; and an upright part bent vertically to the top surface of the terminal part at a front edge or a rear edge of a tip end part of the folded part, wherein a tip end part of the anode lead is directly and electrically connected to a top end surface of the upright part.

2. The solid electrolytic capacitor according to claim 1, wherein the folded part extends from the side edge of the terminal part to a position below the tip end part of the anode lead along the top surface of the terminal part.

3. The solid electrolytic capacitor according to claim 2, wherein a height of the upright part is smaller than a length of the folded part.

4. The solid electrolytic capacitor according to claim 1, wherein the terminal part, the folded part, and the upright part are connected in this order.

5. The solid electrolytic capacitor according to claim 1, wherein the only direct connection between the tip end part of the anode lead and the upright part is at the top end surface of the upright part.

6. A manufacturing method of a solid electrolytic capacitor comprising: a capacitor element from which an anode lead projects forward and having a surface on which a cathode layer is formed; an exterior resin covering the capacitor element; and an anode terminal and a cathode terminal including, respectively, an anode terminal surface and a cathode terminal surface which are exposed from a bottom surface of the exterior resin, wherein the manufacturing method comprises the steps of:

(a) forming a frame body by performing a bending process on a flat plate-like frame member including an anode section which is to be the anode terminal and a cathode section which is to be the cathode terminal, wherein the anode section comprises a terminal forming part including a bottom surface which is to be the anode terminal surface, a belt part extending in a belt shape from the terminal forming part, and a projection part formed at a tip end part of the belt part, the belt part extends in a direction vertical to one direction from the anode section to the cathode section, while the projection part projects from the tip end part of the belt part in said one direction or an opposite direction thereto, in the bending process, the projection part is bent downward vertically to the belt part, and the belt part is folded over to be arranged on a top surface of the terminal forming part to form the frame body;

(b) mounting the capacitor element on a top surface of the frame body, making a tip end part of the anode lead of the capacitor element come into direct contact with a top end surface of the projection part of the frame body, and making the cathode layer come into contact with the cathode section of the frame body; and (c) covering the capacitor element with the exterior resin such that the bottom surface of the terminal forming part is exposed from the bottom surface of the exterior resin, the step (c) being performed after the step (b).

7. The manufacturing method of a solid electrolytic capacitor according to claim 6, wherein the only direct contact between the tip end part of the anode lead and the projection part of the frame body is at the top end surface of the projection part of the frame body.

\* \* \* \* \*